United States Patent
Yun et al.

(10) Patent No.: US 9,229,262 B2
(45) Date of Patent: Jan. 5, 2016

(54) THREE-DIMENSIONAL DISPLAY APPARATUS

(71) Applicant: Samsung Display Co., LTD., Yongin, Gyeonggi-Do (KR)

(72) Inventors: Hae-Young Yun, Suwon-si (KR); Kyung-Ho Jung, Seoul (KR); Seung-Hoon Lee, Yongin-si (KR); Sung-Woon Kim, Suwon-si (KR); Jiangang Lu, Suwon-si (KR); Hee-Seop Kim, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/019,095

(22) Filed: Sep. 5, 2013

(65) Prior Publication Data

US 2014/0002775 A1 Jan. 2, 2014

Related U.S. Application Data (62) Division of application No. 12/476,380, filed on Jun. 2, 2009, now Pat. No. 8,553,332.

(30) Foreign Application Priority Data

Aug. 28, 2008 (KR) .......................... 10-2008-0084441

(51) Int. Cl.
*G02B 27/10* (2006.01)
*G02F 1/1335* (2006.01)
*G02B 27/22* (2006.01)

(52) U.S. Cl.
CPC ...... *G02F 1/133502* (2013.01); *G02B 27/2214* (2013.01)

(58) Field of Classification Search
CPC ............... G02B 27/096; G02B 3/0062; G02B 27/0961; G02B 3/0031
USPC .................................................. 359/619–628
See application file for complete search history.

(56) References Cited

U.S. PATENT DOCUMENTS

| 4,717,949 A | 1/1988 | Eichenlaub |
| 5,579,168 A | 11/1996 | Aoki |
| 5,798,866 A | 8/1998 | De Vaan |
| 6,046,849 A | 4/2000 | Moseley et al. |
| 6,055,103 A * | 4/2000 | Woodgate et al. ....... 359/489.07 |
| 6,157,424 A | 12/2000 | Eichenlaub |
| 6,404,555 B1 * | 6/2002 | Nishikawa .................... 359/619 |
| 6,437,915 B2 | 8/2002 | Moseley et al. |
| 2002/0008916 A1 * | 1/2002 | Nishikawa et al. ........... 359/619 |

(Continued)

FOREIGN PATENT DOCUMENTS

| JP | 07-181385 | 7/1995 |
| JP | 10-333131 | 12/1998 |

(Continued)

*Primary Examiner* — James Greece
(74) *Attorney, Agent, or Firm* — Cantor Colburn LLP (57) ABSTRACT

A display device includes; a display panel, a lens substrate facing the display panel, an air layer disposed between the display panel and the lens substrate, and a light refraction portion disposed on a surface of the lens substrate facing the display panel, wherein an average refractive index of the light refraction portion taken along a plane substantially parallel to the display panel increases in a direction substantially parallel to a path of light from the display panel to the lens substrate.

10 Claims, 5 Drawing Sheets

(56) References Cited

U.S. PATENT DOCUMENTS

2003/0112523 A1* 6/2003 Daniell .................. 359/626
2004/0246225 A1* 12/2004 Mukawa et al. ............ 345/102

FOREIGN PATENT DOCUMENTS

| KR | 1020040035722 | 4/2004 |
| WO | 03015424 A2 | 2/2003 |

* cited by examiner

THREE-DIMENSIONAL DISPLAY APPARATUS

This application is a divisional of U.S. patent application Ser. No. 12/476,380, filed on Jun. 2, 2009, which claims priority to Korean Patent Application No. 10-2008-0084441, filed on Aug. 28, 2008, and all the benefits accruing therefrom under 35 U.S.C. §119, the contents of which in its entirety are herein incorporated by reference.

BACKGROUND OF THE INVENTION (a) Field of the Invention

The present invention relates to a three-dimensional ("3D") image display device having a reverse phase lens structure.

(b) Description of the Related Art

Fast communication services based on the information superhighway are expected to evolve from simpler audio-based services, such as a current telephone service, to audible and visual multimedia services utilizing digital terminals processing characters, voices, and images quickly. Such services are eventually expected to be applied to 3D communication services that enable realistic and stereoscopic viewing and hearing, overcoming temporal and spatial limitations.

Typically, a 3D image is expressed by a principle of stereo vision of two eyes. Binocular disparity (e.g., a disparity images perceived by each of two eyes caused because they are separated apart by a distance of about 65 mm) plays an important role in a stereoscopic effect. That is, when left and right eyes view a 3D reality, each eye individually generates different 2D images and the two images are transmitted to the brain, the brain combines the two images to perceive depth in the original 3D reality. Such an ability is usually called stereography.

3D image display schemes using the binocular disparity are typically categorized, depending on a necessity for spectacles, as stereoscopic schemes such as a polarization scheme and a time divisional scheme, and autostereoscopic schemes such as a parallax barrier scheme and a lenticular scheme.

According to the stereoscopic schemes, a mass of people may simultaneously enjoy 3D images from all viewing angles if the polarization spectacles or liquid crystal shutter spectacles are worn. However, due to a drawback that the polarization spectacles or liquid crystal shutter spectacles must be worn, the stereoscopic schemes are not commonly used, and the stereoscopic schemes are typically limited to use in movie theatres.

In contrast, according to the various autostereoscopic schemes, there is a merit that additional spectacles are not required when enjoying the stereoscopic image.

Recently, according to the demands of the large scale and the reduction of thickness of display devices, techniques for reducing the weight and thickness of the display devices are required. Also, if the viewing angle is increased, the 3D visible region where the stereoscopic image can be shown is limited by increasing confusion between images viewed at each position within the viewing angle such that it is necessary to expand the 3D visible region through the wide viewing angle.

BRIEF SUMMARY OF THE INVENTION

Accordingly, the present invention improves three-dimensional ("3D") display quality, and realizes a reduction of weight and thickness of a 3D module by applying a reverse phase lens structure.

An exemplary embodiment of a display device according to the present invention includes; a display panel, a lens substrate facing the display panel, an air layer disposed between the display panel and the lens substrate, and a light refraction portion disposed on a surface of the lens substrate facing the display panel, wherein an average refractive index of the light refraction portion taken along a plane substantially parallel to the display panel increases in a direction substantially parallel to a path of light from the display panel to the lens substrate.

In one exemplary embodiment, the light refraction portion may have a lens including a convex surface and a flat surface, and the convex surface may be oriented toward the display panel, and the flat surface may contact the lens substrate.

In one exemplary embodiment, the lens may be made of a thermal hardening resin.

In one exemplary embodiment, a surface of the lens may be treated by the low reflection surface treatment.

In one exemplary embodiment, a low reflection surface layer formed on the lens substrate may be further included.

In one exemplary embodiment, a spacer disposed between the display panel and an edge of the lens substrate may be further included.

In one exemplary embodiment, a thickness of the spacer may be controlled such that a thickness of the air layer disposed between the lens substrate and the display panel may be controlled.

In one exemplary embodiment, a chassis enclosing the display panel may be further included, and the spacer may contact an outer surface of the chassis and the edge of the lens substrate.

In one exemplary embodiment, a chassis enclosing the display panel and the lens substrate may be further included.

In one exemplary embodiment, an upper polarizer and a lower polarizer respectively disposed above and below the display panel may be further included.

In one exemplary embodiment, the upper surface of the upper polarizer may be treated by a low reflection surface treatment.

Another exemplary embodiment of an image display device according to the present invention includes; a display panel, a light-transmitting portion disposed on the display panel and comprising a refractive isotropic material, a substrate facing the display panel, and a light refraction portion disposed between the substrate and the light-transmitting portion and comprising a refractive anisotropic material.

In one exemplary embodiment, the light refraction portion may include a refractive anisotropic material including a portion having substantially the same refractive index as the material of the light-transmitting portion, and a portion having a larger refractive index than the light-transmitting portion.

In one exemplary embodiment, a low reflection surface layer disposed on the substrate may be further included.

In one exemplary embodiment, a spacer disposed between the display panel and an edge of the substrate may be further included.

In one exemplary embodiment, an upper polarizer and a lower polarizer respectively disposed above and below the display panel may be further included.

According to the present invention, resolution of the same degree as the front direction is maintained when increasing the viewing angle such that the 3D wide viewing angle may be realized, and the number of air layers between the panel and the module outermost surface is reduced such that transmittance may be improved. Also, the number of air layers is reduced such that the reflection of surrounding light is reduced and visibility is improved, and the number of component elements is reduced to thereby realize a reduction of weight and thickness of the 3D module.

DETAILED DESCRIPTION OF THE INVENTION

The invention now will be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

Figure 1:
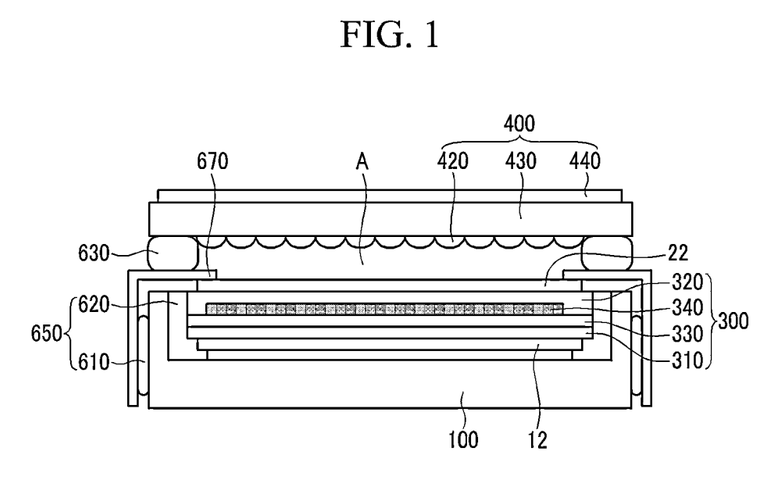
FIG. 1 is a cross-sectional view of an exemplary embodiment of a three-dimensional ("3D") image display according to the present invention.

FIG. 1 is a cross-sectional view illustrating an exemplary embodiment of a three-dimensional ("3D") image display device according to the present invention.

Referring to FIG. 1, an exemplary embodiment of a 3D image display device according to the present invention includes a display panel 300, a stereoscopic image formation unit 400, an upper polarizer 22, and a lower polarizer 12. Also, to support the constituent elements the 3D image display device includes a fixing unit 650 including a first fixing unit 620 and a second fixing unit 610, a spacer 630, a chassis 670, and a supporting unit 100.

Now, an exemplary embodiment of the display panel 300, which in the present exemplary embodiment is a liquid crystal display ("LCD"), as an image panel will be described in more detail.

The display panel 300 includes a thin film transistor ("TFT") substrate 310, a color filter substrate 320, and a liquid crystal layer 330.

Firstly, the TFT substrate 310 includes signal lines such as a gate line and a data line, and is formed with a TFT (not shown) and a pixel electrode (not shown) per pixel area, which in one exemplary embodiment may be bound by the gate line and the data line. Here, the TFT controls the application of image signals transmitted through the data line to the pixel electrode according to scanning signals transmitted through the gate line.

The display panel 300 is usually categorized as, depending on shape of the pixel electrode, a backlit display panel, a reflective display panel, or a transflective display panel which includes characteristics of the backlight display panel and the reflective display panel, and a display panel of any type may be used as the 3D image display device according to an exemplary embodiment of the present invention.

The color filter substrate 320 faces the TFT substrate 310 with a predetermined interval therebetween. The color filter substrate 320 is formed with a color filter 340, and in exemplary embodiments, although not shown, a black matrix, a common electrode, and various other components, may be formed thereon.

In one exemplary embodiment, red, green, and blue color filters are disposed for the color filter 340 to display the same color according to the color filter pixel row, however various alternative exemplary embodiments of color filter arrangements may be used. According to the present exemplary embodiment each pixel row consists of pixels disposed according to a direction of extension of the data line.

A liquid crystal material is injected between the TFT substrate 310 and the color filter substrate 320 to form the liquid crystal layer 330. According to the liquid crystal arrangement of the liquid crystal layer 330, the liquid crystal display may have various display modes, and a twisted nematic ("TN") mode, a patterned vertical alignment ("PVA") mode, and an electrically controlled birefringence ("ECB") mode have been mainly used. If the TN mode is described as an example of the present exemplary embodiment, the TN mode has retardation such that polarization axis rotation of 90 degree is generated under a state in which an electric field is not applied to the liquid crystal layer 330.

The upper polarizer 22 and the lower polarizer 12 are disposed above and below the display panel 300, respectively.

Next, an exemplary embodiment of the stereoscopic image formation unit 400, which is a core portion for forming a stereoscopic image, will be described.

The stereoscopic image formation unit 400 refracts light emitted from the display panel 300 and distributes the light to left or right eyes in order to form a 3D image. The stereoscopic image formation unit 400 includes a lens 420, a lens substrate 430, and a low reflection surface layer 440.

A plurality of lenses 420 disposed in a row direction are formed on the surface of the lens substrate 430 facing the display panel 300. In one exemplary embodiment, the lens 420 has a shape of a curvature column that is vertically cut. Exemplary embodiments of the curvature column include a circular cylinder and an elliptical cylinder, and the cut position where the curvature column is vertically cut is the center of the curvature column or away from the center of the curvature column by a predetermined distance (in one exemplary embodiment the predetermined distance is more than 0 and less than the radius of the center of the curvature column). That is, in one exemplary embodiment the lens 420 has a convex surface and a flat surface. In one exemplary embodiment the cut columns extend substantially along the length of the stereoscopic image formation unit (shown as being into the page in the cross-sectional view of FIG. 1). The lens 420 has the function of refracting the light and realizing multi-view images. In one exemplary embodiment, the lens 420 may be made using a thermal hardening resin.

The lens substrate 430 contacts the flat surface of the lens 420, and the convex portion of the lens 420 is formed in the direction facing the display panel 300. This structure is distinguished from a conventional structure wherein the convex portion of the lens is formed in the direction from which a viewer sees the images, and the flat portion of the lens is disposed toward the display panel. Accordingly, in the conventional lens structure, a protection plate is additionally required on the lens as well as a lens substrate supporting the lens. Also, in the conventional lens structure an air layer is required with a predetermined thickness to prevent the lens from directly contacting the protection glass plate, and the thickness of the entire 3D display is thereby increased. In the current exemplary embodiment of a display device according to the present invention, the lens substrate 430 itself has a function of a protection glass such that a separate protection plate is not required and the thickness of the display device is decreased, and the number of air layers is decreased such that the transmittance is improved and the visibility is improved.

The low reflection surface layer 440 is formed on the lens substrate 430. The low reflection surface layer 440 has a function of preventing reflection of incident light. Accordingly, the exemplary embodiment of a display device according to the present invention may improve the visibility in a bright environment. The low reflection surface layer 440 covers a base film (not shown) on the lens substrate 430, and in one exemplary embodiment may be formed by alternately depositing a material having a high refractive index and a material having a low refractive index.

The display panel 300 is attached to the supporting unit 100 to protect the 3D image display device of the present invention. The first fixing unit 620 fixes the display panel 300 between the supporting unit 100 and the display panel 300. The chassis 670 encloses the side surface edge of the supporting unit 100 and the upper surface edge of the supporting unit 100. The second fixing unit 610 may be disposed between the vertical portion of the chassis 670 and the side surface of the supporting unit 100. The spacer 630 is formed between the vertical portion of the chassis 670 and the edge of the lens substrate 430. The spacer 630 combines the stereoscopic image formation unit 400 and the display panel 300 to each other, and functions to form an air layer A between the lens substrate 430 and the upper polarizer 22. In one exemplary embodiment, the thickness of the air layer A may be determined by the thickness of the spacer 630. In one exemplary embodiment, the lens 420 may not be formed on the edge of the lens substrate 430 in contact with the spacer 630. While one exemplary embodiment of a supporting unit 100, fixing unit 650 and chassis 670 have been described, alternative exemplary embodiments include alternative configurations to orient, fix and support the display panel 300 with respect to the stereoscopic image formation unit 400.

The thickness of the air layer A may be determined by the condition of the image formation. The thickness of the medium is increased according to an increase of the refractive index of the medium, and since the air layer A has a refractive index of 1.0 that is less than the refractive index of 1.5 of glass, when the air layer A is formed between the upper polarizer 22 and the lens 420, the thickness may be thinner than if the glass were formed between the polarizer 22 and the lens 420. Also, the convex portion of the lens 420 does not directly contact the upper polarizer 22 and is away therefrom such that the air layer A prevents the formation of an interference pattern.

Referring to FIG. 1, another exemplary embodiment that is different from the previous exemplary embodiment of the present invention will be described.

Referring again to FIG. 1, a light-transmitting portion made of an isotropic material may be formed in the air layer A. The light-transmitting portion does not reflect light that is incident from the display panel 300 and may transmit the light without modification. A light refraction portion may be formed between the light-transmitting portion and the lens substrate 430 to replace the lens 420. It is not necessary for the light refraction portion to have a convex surface. In one exemplary embodiment, the light refraction portion may be made of an anisotropic material. The light refraction portion may be made of the anisotropic material including a portion having substantially the same refractive index as that of the material of the light-transmitting portion and a portion having a larger refractive index than that of the material of the light-transmitting portion. When the material is limited as described above, the same effects as those of the exemplary embodiment of a reverse lens structure that is described above may be obtained.

Figure 2:
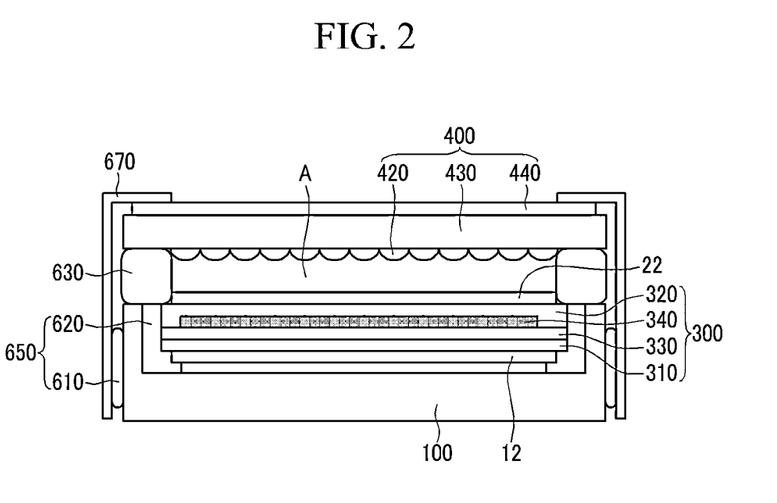
FIG. 2 is a cross-sectional view of another exemplary embodiment of a 3D image display device according to the present invention.

FIG. 2 is a cross-sectional view of another exemplary embodiment of a 3D image display device according to the present invention.

Referring to FIG. 2, the main constituent elements are substantially similar to those of the exemplary embodiment of a display device illustrated with reference to FIG. 1. However, the display device of FIG. 1 has the structure in which the stereoscopic image formation unit 400 is attached to the chassis 670 of a 2D LCD, and the exemplary embodiment shown in FIG. 2 has a structure that is combined with the chassis 670 after the supporting unit 100 and the stereoscopic image formation unit 400 enclosing the display panel 300 are combined.

Figure 3A:
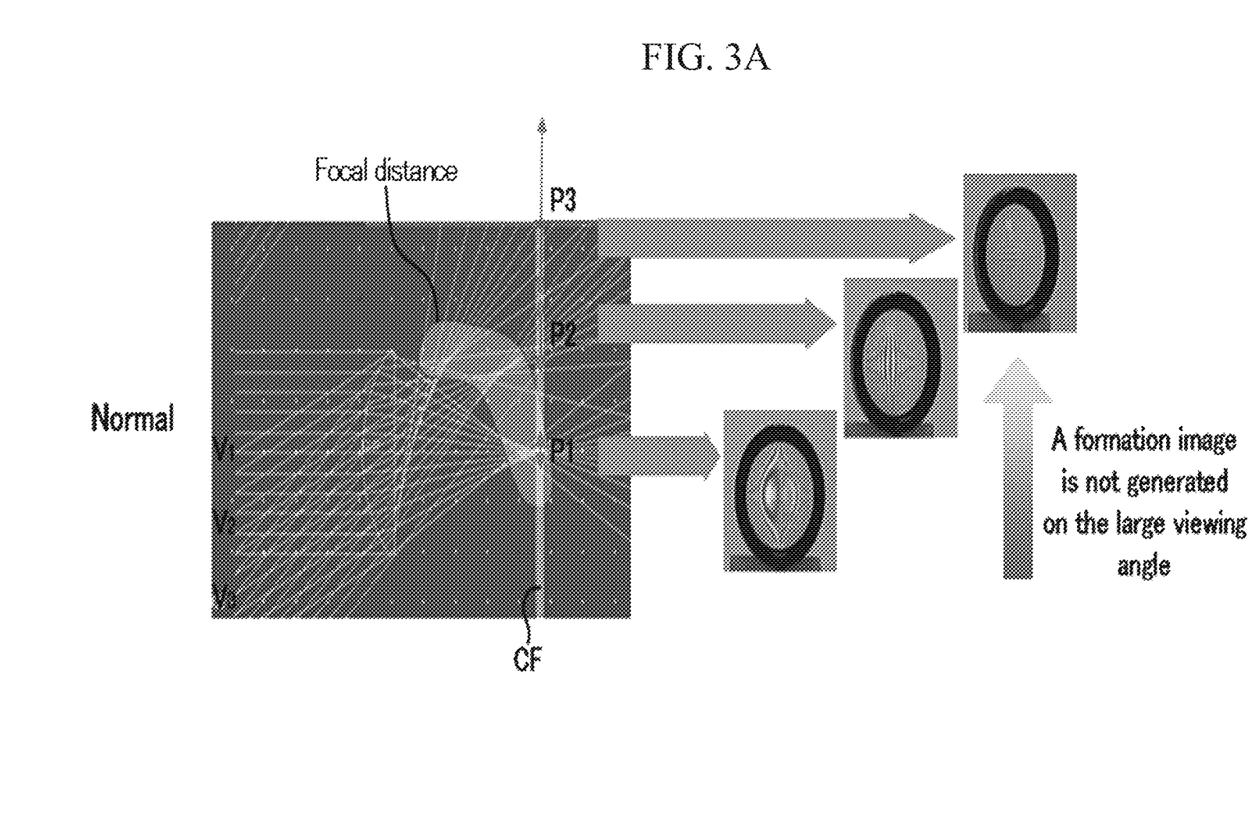
FIG. 3A is a schematic view illustrating the degree of image formation according to an increase in viewing angle according to a normal lens structure.
Figure 3B:
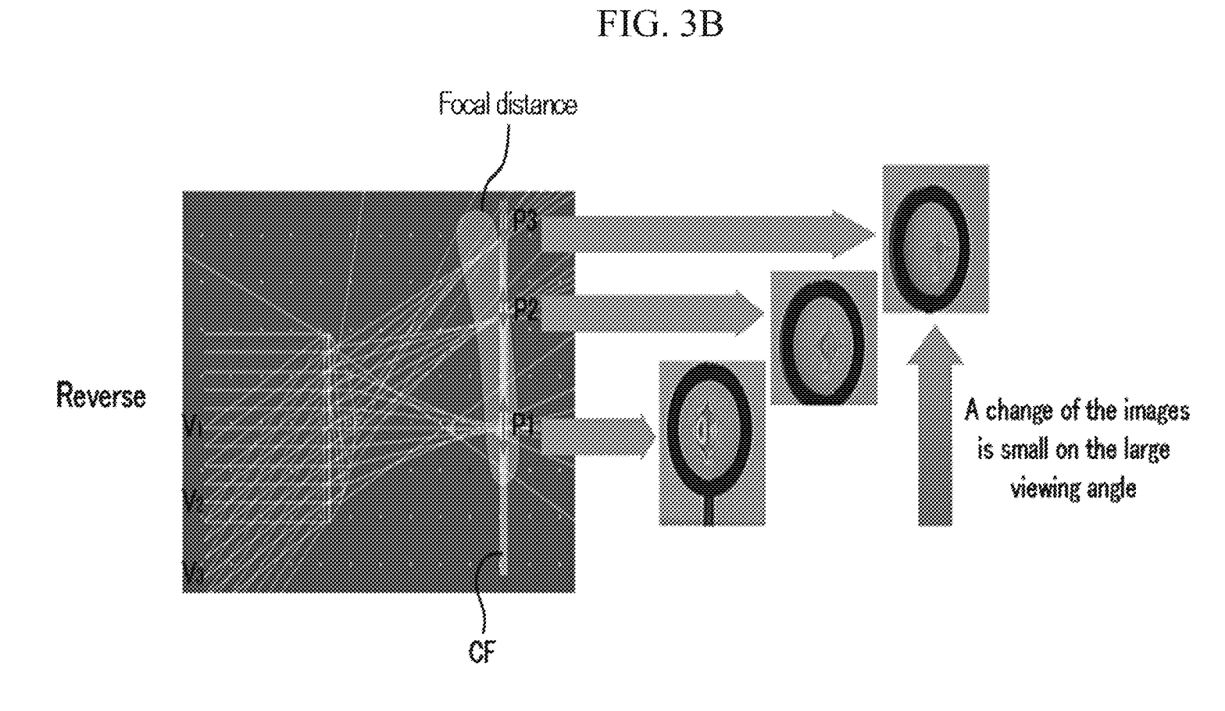
FIG. 3B is a schematic view illustrating the degree of image formation according to an increase in viewing angle according to a reverse lens structure.

FIG. 3A is a schematic view illustrating the degree of image formation according to an increase in viewing angle according to a normal lens structure, and FIG. 3B is a schematic view illustrating the degree of image formation according to an increase in the viewing angle according to a reverse lens structure.

Referring to FIGS. 3A and 3B, the lines represent the respective light paths corresponding to the viewpoints V1, V2, and V3 of a viewer at various locations external to the display, and P1, P2, and P3 represent portions of the color filter among a plurality of color filters CF. V1 is a view point of the front direction of the display device, and the viewing angle is increased toward V2 and V3.

Firstly, the normal lens structure will be described with respect to FIG. 3A. As seen from the view point V1, the image generated from the color filter P1 is formed into a clear image, as shown in FIG. 3. However, the phase is changed according to an increase of the viewing angle, and the image formation is not generated on the view point V3. The focal distance, represented herein by the lightly shaded structure, is decreased according to the increasing of the viewing angle, the several images generated from the color filter P3 are simultaneously recognized at the view point V3 such that confusion, e.g., an area of low resolution, is generated and no coherent image results.

Referring now to FIG. 3B, the reverse lens structure will be described. Although the viewing angle is increased moving from V1 to V2 to V3, the change of the image is small. In other words, although the viewing angle is increased, the degree that the focal distance is reduced is much smaller than that of the normal lens structure. In the 3D optical system, the focus is desirable to be appropriately large, and the change according to the viewing angle is desired to be small. In the exemplary embodiment of a display device according to the present invention, the reverse lens structure is applied such that although the viewing angle is increased, the reduction of the focus is small, and the wide viewing angle characteristic may be realized, e.g., even though the viewing angle is large, little to no confusion is generated and a coherent image results.

Figure 4:
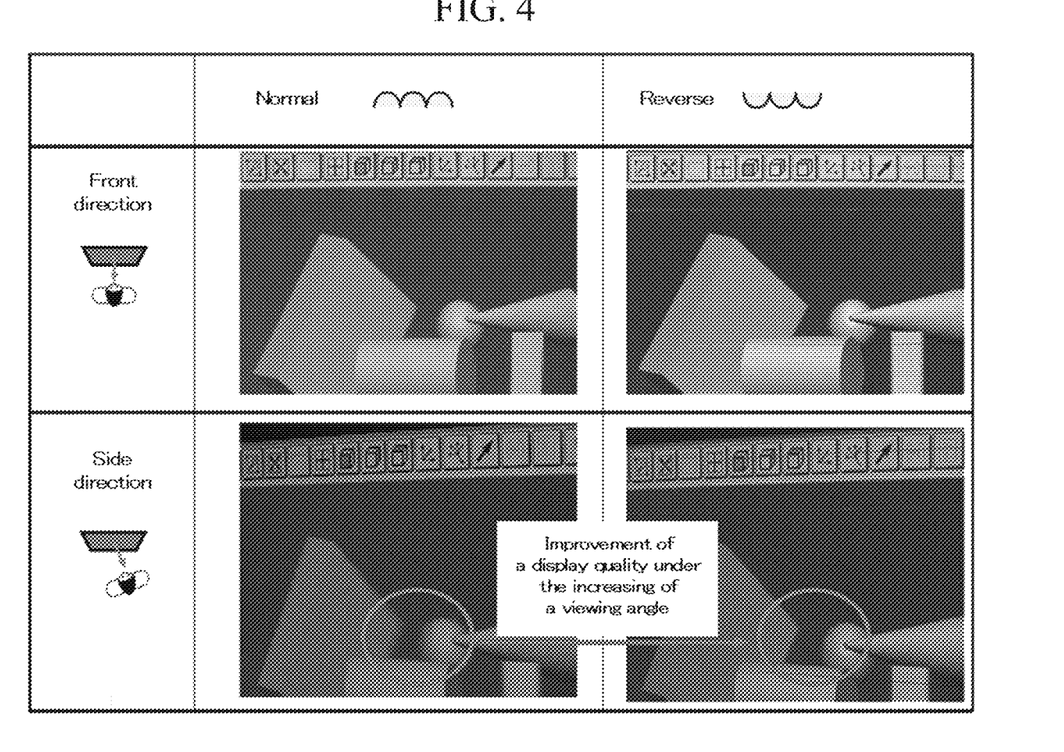
FIG. 4 is a photograph comparing the display qualities of a 3D image display device using a normal lens structure and a 3D image display device using a reverse lens structure as seen from a front direction and a side direction.

FIG. 4 is a photograph comparing the display qualities of a 3D image display device using a normal lens structure and a 3D image display device using a reverse lens structure as seen from a front direction and a side direction.

Referring to FIG. 4, the differences of the display qualities for the normal lens structure and the reverse lens structure are small when viewing from the front direction. However, when viewing from the side direction, the display quality of the reverse lens structure is clearer than the display quality of the normal lens structure.

Figure 5:
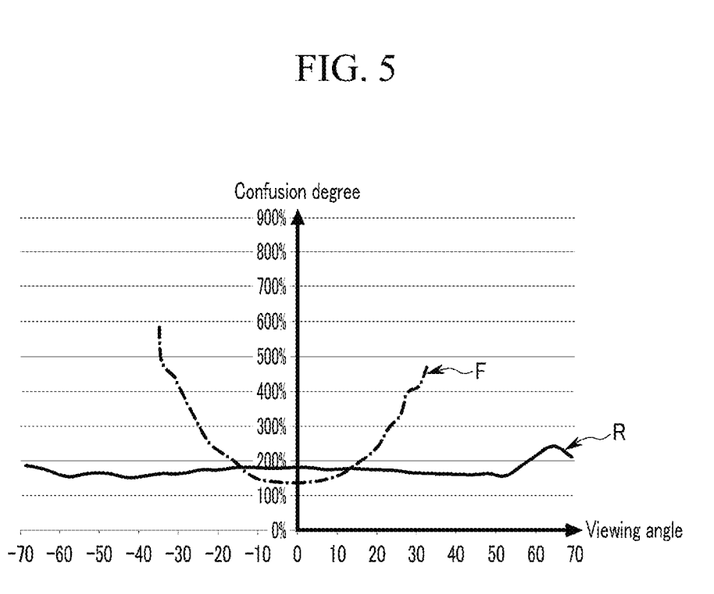
FIG. 5 is a graph illustrating a confusion degree according to a viewing angle of a 3D image display device using a normal lens structure and a 3D image display device using a reverse lens structure.

FIG. 5 is a graph illustrating a confusion degree according to a viewing angle of a 3D image display device using a normal lens structure and a 3D image display device using a reverse lens structure. As used herein the confusion corresponds to the resolution of the stereoscopic image, and if the confusion is increased, the resolution is decreased.

Referring to FIG. 5, when the normal lens structure is applied, as indicated by a graph line F, the confusion is largely increased according to the increase of the viewing angle. However, when applying the reverse lens structure, as indicated by a graph line B, though the viewing angle is increased, the change of the confusion is not large.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
   a display panel comprising a color filter;
   a substrate facing the display panel;
   a light-transmitting portion between the display panel and the substrate, the light-transmitting portion comprising a refractive isotropic material; and
   a light refraction portion disposed under a surface of the substrate facing a substantially planar surface of the display panel from which light is emitted therefrom,
   wherein the light refraction portion comprises a refractive anisotropic material, and
   wherein the light refraction portion faces the substantially planar surface of the display panel from which light is emitted therefrom before being received by the light refraction portion.

2. The display device of claim 1, wherein the light refraction portion comprises a refractive anisotropic material including a portion having substantially the same refractive index as the material of the light-transmitting portion and a portion having a larger refractive index than the light-transmitting portion.

3. The display device of claim 2, further comprising:
   a low reflection surface layer disposed on the substrate.

4. The display device of claim 2, further comprising:
   a spacer disposed between the display panel and an edge of the substrate.

5. The display device of claim 4, further comprising:
   an upper polarizer and a lower polarizer respectively disposed above and below the display panel.

6. The display device of claim 5, wherein the upper surface of the upper polarizer is treated by a low reflection surface treatment.

7. The display device of claim 4, wherein a thickness of the spacer is controlled such that a thickness of the light-transmitting portion disposed between the substrate and the display panel is controlled.

8. The display device of claim 4, further comprising:
a chassis enclosing the display panel,
wherein the spacer contacts an outer surface of the chassis and the edge of the lens substrate.

9. The display device of claim 4, further comprising:
a chassis enclosing the display panel and the lens substrate.

10. The display device of claim 1, wherein the display panel is disposed between the substrate and a light source providing light to the display panel before the substrate receives the light which is emitted from the substantially planar surface.

\* \* \* \* \*